(12) United States Patent
Hillen et al.

(10) Patent No.: US 7,772,524 B2
(45) Date of Patent: Aug. 10, 2010

(54) INTEGRATING SENSORS OVER A DIGITAL LINK

(75) Inventors: Edward D. Hillen, Painesville, OH (US); Stephen M. Kainec, South Euclid, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 1170 days.

(21) Appl. No.: 11/040,621

(22) Filed: Jan. 21, 2005

(65) Prior Publication Data

US 2006/0163227 A1    Jul. 27, 2006

(51) Int. Cl.
 B23K 9/095    (2006.01)
(52) U.S. Cl. .................... 219/130.01; 219/132; 219/136
(58) Field of Classification Search ............ 219/130.01, 219/132, 136
See application file for complete search history.

(56) References Cited

U.S. PATENT DOCUMENTS

| | | | |
|---|---|---|---|
| 5,059,765 A | 10/1991 | Laing | |
| 5,305,183 A | 4/1994 | Teynor | |
| 5,471,026 A | 11/1995 | Ilies | |
| 6,486,439 B1 * | 11/2002 | Spear et al. | 219/136 |
| 6,583,386 B1 * | 6/2003 | Ivkovich | 219/130.01 |
| 6,735,484 B1 | 5/2004 | Lenz | |
| 7,045,742 B2 * | 5/2006 | Feichtinger et al. | 219/132 |
| 2002/0154605 A1 | 10/2002 | Preston et al. | |
| 2003/0052094 A1 | 3/2003 | Sorg et al. | |
| 2004/0045945 A1 | 3/2004 | Shimogama et al. | |
| 2004/0218602 A1 | 11/2004 | Hrastar | |
| 2004/0259533 A1 | 12/2004 | Nixon et al. | |
| 2005/0029326 A1 | 2/2005 | Henrikson | |
| 2005/0071691 A1 | 3/2005 | Pomaranski et al. | |
| 2005/0177269 A1 | 8/2005 | Funk | |

FOREIGN PATENT DOCUMENTS

WO    0247860    6/2002

OTHER PUBLICATIONS

Bertocco et al. "A distributed sensor network based on Jini (TM) technology", International Symposium on Virtual and Intelligent Measurement Systems, May 2002.*
Beveridge, "Jini on the Control Area Network (CAN): A Case Study in Portability Failure", M.S. Project Report, Carnegie Mellon University, Mar. 2001.*
European Search Report for European Patent Application Serial No. EP06000497 dated May 2, 2007.
Office Action for Chinese Patent Application No. 200610005977.8, dated Apr. 10, 2008.
Office Action for European Patent Application No. 06000497.5, dated Apr. 27, 2008.
Office Action for Mexican Patent Application No. PA/a/2006/000817, dated Jul. 3, 2009.
Office Action for Mexican Patent Application No. PA/a/2006/000817, dated Sep. 28, 2009.

* cited by examiner

*Primary Examiner*—Mark H Paschall
(74) *Attorney, Agent, or Firm*—Turocy & Watson, LLP

(57) ABSTRACT

A system that facilitates dynamic configuration of a welding system with respect to a sensor comprises a processing unit associated with the welding system. A configuration component facilitates configuring the welding system with respect to the sensor upon determining that the sensor is coupled to a local bus associated with the processing unit. A remote access component can facilitate remotely accessing the welding system, the configuration of the welding system alterable by way of the remote access component.

31 Claims, 10 Drawing Sheets

INTEGRATING SENSORS OVER A DIGITAL LINK

TECHNICAL FIELD

The subject invention relates generally to sensor configurations within a manufacturing environment, and more particularly to configuring a welding system in relation to one or more sensors.

BACKGROUND OF THE INVENTION

Welding systems reside at the core of the modern industrial age. From massive automobile assembly operations to automated manufacturing environments, these systems facilitate joining in ever more complicated manufacturing operations. One such example of a welding system includes an electric arc welding system. This may involve movement of a consumable electrode, for example, toward a work piece while current is passed through the electrode and across an arc developed between the electrode and the work piece. The electrode may be a non-consumable or consumable type, wherein portions of the electrode may be melted and deposited on the work piece. Often, hundreds or perhaps thousands of welders are employed to drive multiple aspects of a construction process, wherein sophisticated controllers enable individual welders to operate within relevant portions of the process.

For example, some of these aspects relate to control of power and waveforms supplied to the electrode, movements or travel of a welding tip during welding, electrode travel to other welding points, gas control to protect a molten weld pool from oxidation at elevated temperatures and provide ionized plasma for an arc, and other aspects such as arc stability to control the quality of the weld. To enable precise control of a welding process (such as one of the welding processes above), various sensors are often employed to provide data relating to one or more aspects of the process. For instance, data relating to heat of a weld, moisture in a region subject to welding, contact sensors, and the like can all provide data that is utilized to control and/or monitor a welding process. These sensors need to be configured to enable obtainment of data therefrom.

Configuring disparate welding units with particular sensors, however, can be quite challenging, as sensors are often manufactured by different vendor(s) than vendor(s) that manufacture the welding units. A conventional solution to this configuration issue is to hard-wire desirable sensors to a welding unit, microprocessor and/or microcontroller associated with a welding unit. For example, a welding unit can be purchased for a particular application, and sensor(s) can be hardwired at a time of sale to render the welding unit suitable for such application. Applications associated with welding units, however, can be frequently subject to change, thereby rendering the sensor configuration ill-suited for a new application. Furthermore, it can be later determined that disparate sensors are useful for diagnostic purposes with respect to a welding unit or process, as well as monitoring quality of welds undertaken by such welding unit. In conventional welding systems, if a disparate sensor is needed, a technician must be employed to hardwire such sensor to a welder. Accordingly, dedicated ports may need to be added to the welder and/or a computer related thereto to enable utilization of the new sensor. Furthermore, the computer must then be configured to analyze data output by the sensor in order to employ such data in a useful manner. Such configuration is costly, as the welding system can be disabled for an extended period of time, thus adversely affecting manufacturing throughput. Moreover, a skilled technician is required to effectuate any alterations made to sensors associated with a welding system, thereby increasing monetary costs.

Accordingly, there exists a need in the art for a system and/or methodology for dynamically adding, removing, and/or configuring sensors with a welding system.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to novel systems and/or methodologies for configuring a welding system in accordance with a newly added and/or recently removed sensor(s). In particular, one or more aspects of the subject invention mitigate deficiencies of conventional systems with respect to hard-wired sensors. In general, the subject invention relates to dynamically configuring a welding system upon detecting alteration of sensors upon a local bus, wherein such local bus is utilized for communications between welding devices (e.g., sensors, motors, . . . ) and a processing unit. The processing unit can be employed to control and/or monitor a welding process being undertaken within the welding system.

When one or more sensors are coupled to the local bus, a configuration component can detect such coupling and configure the welding system in accordance with the newly added sensor(s). Similarly, if one or more sensors are removed from the local bus, the configuration component can configure the welding system in accordance with the recently removed sensor(s). Thus, rather than requiring a technician to hard-wire sensors in relation to a welding unit, the subject invention enables dynamic addition and/or removal of sensors within a welding system and configuration of such system accordingly. For example, a process monitoring application can be configured to monitor a process utilizing a voltage sensor and a tachometer (to measure motor speed). It may, however, be desirable to add a gas flow sensor in connection with monitoring the process. In accordance with an aspect of the subject invention, the gas flow sensor can be coupled to the local bus, and such coupling can be detected. Thereafter, the configuration component can configure the process monitoring application to receive and analyze data from the gas flow sensor, and monitor the process as a function of such data.

In accordance with another aspect of the subject invention, a configuration of a process monitoring application can be altered remotely. In particular, a remote access component can enable an operator to remotely review sensors that are coupled to the local bus, and further enable the operator to remotely review process monitoring applications that utilize such sensors. Thereafter, the remote operator can modify the application process monitor to analyze data received from disparate sensors. Furthermore, the remote operator can select particular sensors and watch data output therefrom in order to glean information relevant to a particular welding process. In accordance with yet another aspect of the subject invention, a security component can be employed to ensure that only authenticated operators can access/modify a configuration relating to sensors upon a local bus. Furthermore, the security component can be utilized to ensure that only authenticated sensors are added to the local bus.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Figure 1:
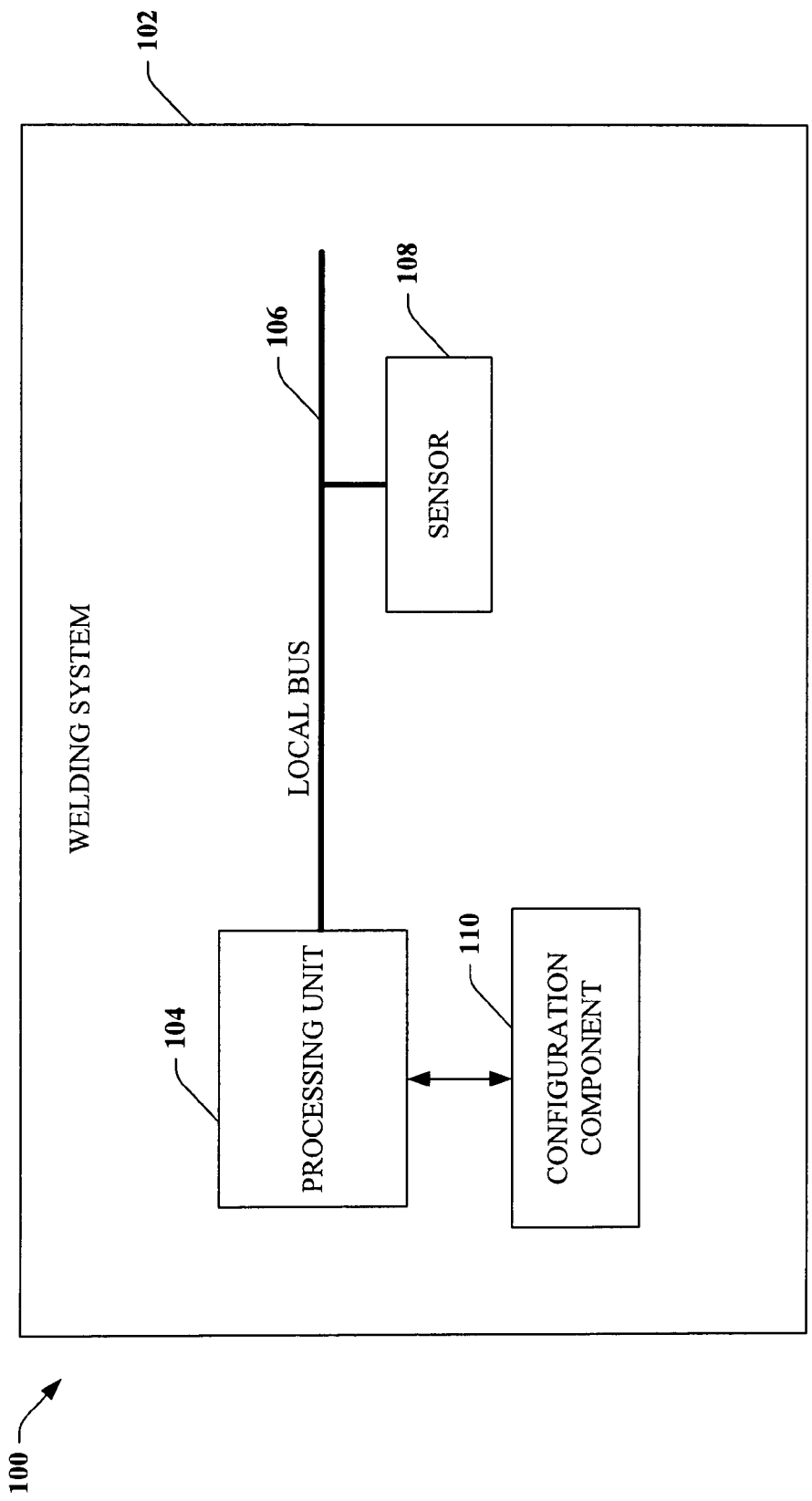
FIG. 1 is a high-level block diagram of a system that facilitates dynamically configuring a welding system with respect to a sensor in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, a computer readable memory encoded with software instructions, and/or a computer configured to carry out specified tasks. By way of illustration, both an application program stored in computer readable memory and a server on which the application runs can be components. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

A "welder" or "welding unit" refers to physical hardware for producing a weld such as a wire feeder, contact tip, dresser, gas mixer, gas sneezer, gas controller, clamp actuator, travel carriage/part manipulator, robot arm/beam/torch manipulator, laser seam tracker, other input/output devices and welding power source along with any controller(s), monitor(s), and communications interface(s) associated with the physical hardware. For example, a welder can be used to perform gas metal arc welding (GMAW), flux cored arc welding, metal cored arc welding, submerged arc welding (SAW), narrow groove welding, gas tungsten arc welding (GTAW), plasma arc welding, electron beam and laser welding, hard surfacing welding, arc gouging and manual shielded arc welding (SMAW).

"Welding process" refers to a step or steps involved in a joining process and can include consumables to be used in the process along with settings for various aspects of a welding system before, during, and/or after the joining process. For example, some of these aspects relate to control of power and waveforms supplied to an electrode, movements or travel of a welding tip during welding, electrode travel to other welding points, gas control to protect a molten weld pool from oxidation at elevated temperatures and provide ionized plasma for an arc, and other aspects such as arc stability to control quality of the weld.

Referring now to the drawings, FIG. 1 illustrates a high-level system overview in connection with one particular aspect of the subject invention. The subject invention relates to a novel system 100 that facilitates configuration of a welding system 102. The welding system 102 can include one or more welding units and devices that effectuate operability of such units. Furthermore, the welding system 100 can be associated with quality monitoring hardware/software, a graphical user interface (GUI) that enables an operator to monitor one or more welds being performed by one or more welding units, and other suitable devices that effectuate a weld. The welding system 102 includes a processing unit 104, wherein such processing unit 104 is at least partially employed in connection with monitoring processes undertaken by the welding system 102 (e.g., processes relating to one or more welding units). The processing unit 104 can be a microprocessor, a microcontroller, or any other suitable processing mechanism that can be utilized for process control/monitoring. Furthermore, the processing unit 104 can be associated with internal memory and/or an external memory device (e.g., a hard drive, disk, RAM, or any other suitable data storage mechanism).

The processing unit 104 is associated with a local bus 106 that is utilized to communicate with devices pertinent to the processing unit 104. In general, buses are employed to transfer data or power between computer components and/or other electronic devices. Buses typically can logically connect several devices over a same set of wires. By way of illustration, the local bus 106 can utilize any suitable bus architecture, such as Control Area Network (CAN), an Ethernet architecture, Industrial Standard Architecture (ISA), Micro-Channel Architecture (MSA), Extended ISA (EISA), Intelligent Drive Electronics (IDE), VESA Local Bus (VLB), and the like. A sensor 108 is communicatively coupled to the processing unit 104 by way of the local bus 106 (e.g., the sensor 108 is connected directly to the local bus 108). Thus, the processing unit 104 can receive data from the sensor 108 over the local bus 106. The processing unit 104 is associated with a configuration component 110 that facilitates configuring the welding system 102 (and the processing unit 104) to accommodate the sensor 108. Moreover, if the sensor 108 is associated with sufficient processing and memory capabilities, the configuration component 110 can facilitate configuring the sensor 108 to operate in connection with the processing unit 104. While shown as being separate from the processing unit 104, it is understood that the configuration component 110 can be included within memory within such processing unit 104. In a disparate embodiment, the configuration component 110 can be stored in memory external to such processing unit. For instance, the configuration component 110 can be distributed across a plurality of memory devices.

In accordance with one aspect of the subject invention, the processing unit 104 can detect that the sensor 108 has been added to the local bus 106. Upon such detection, the configuration component 110 can query the sensor 108 to determine a type of such sensor 108. For example, the sensor can be a voltage and/or current sensor utilized to monitor voltages output by a power source within the welding system 102, a tachometer for monitoring motor speed associated with a welding unit, a gas flow sensor, linear wire speed sensor, an ambient temperature sensor, a humidity sensor, a gap sensor, a proximity sensor (to monitor proximity of objects to a welding flame), a camera-based sensor employed to visually monitor a weld, and any other suitable sensor that can be utilized in connection with monitoring/controlling a welding process. Upon determining the sensor type (and location upon the local bus 106), the configuration component 110 can automatically configure a process monitoring application to receive and utilize data from the sensor 108. For example, the sensor 108 can be a gas flow sensor that has been coupled to the local bus 106. The configuration component 110 can determine existence of the sensor 108 upon the local bus 106, and thereafter automatically configure a process monitoring application to receive and analyze data therefrom.

In accordance with another aspect of the subject invention, an operator can review sensors upon the local bus 106 and configure them with a process monitoring application as desired. For instance, a plurality of sensors can be resident upon the local bus 106, and an operator can review such sensors in connection with a particular welding application. Thereafter, the operator can select which sensors should be employed for the application. For a specific example, a gap sensor, a voltage sensor, a current sensor, and a gas flow sensor can be resident upon the local bus 106. An operator, in accordance with an aspect of the subject invention, can receive information relating to the sensors and determine that all such sensors are resident upon the local bus 106. Thereafter, the operator can select particular sensors to be employed in connection with a process monitoring application. For instance, the operator can choose to employ only the gas flow sensor and the gap sensor to monitor a welding process, as the other sensor(s) may generate superfluous data not pertinent to the application. Furthermore, the operator can review types of sensors associated with particular welding units. Thus, the subject invention can be associated with a graphical user interface that provides an operator with substantial information relating to a process. In particular, the graphical user interface can provide the operator with details regarding available sensors in connection with a welding unit as well as process monitoring options.

Accordingly, the subject invention provides for various benefits over conventional systems of configuring welding systems. More particularly, the subject invention allows for flexible, dynamic addition and removal of sensors with respect to various welding units. For instance, a sensor can be added and configured with respect to a process monitoring application by simply coupling the sensor to the local bus 106. In contrast, conventional systems utilize sensors that are hard-wired to a welding unit and/or a processing unit that is employed in connection with a process monitoring application. Thus, it is extremely difficult to add or remove sensors when utilizing conventional systems, and is also difficult to modify a process monitoring application.

Figure 2:
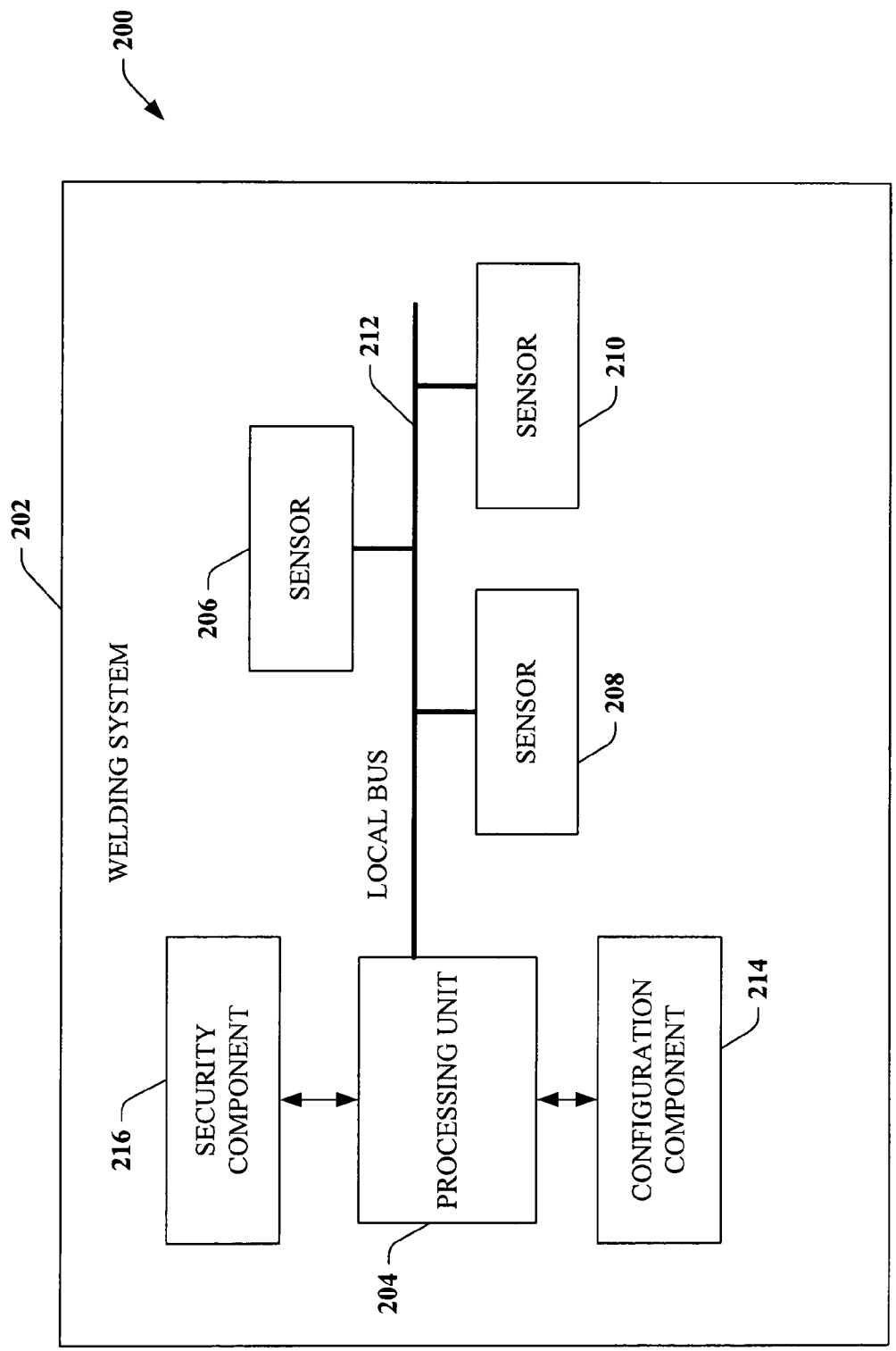
FIG. 2 is a block diagram of a system that facilitates authentication of an operator and/or device prior to configuring a welding system with respect to a sensor in accordance with an aspect of the subject invention.

Turning now to FIG. 2, a system 200 that facilitates configuring a welding system 202 is illustrated. The welding system 202 includes a processing unit 204 that is utilized to monitor a welding process undertaken by one or more welding units (not shown) within the welding system 202 and/or control a welding process undertaken by one or more welding units within the welding system 202. The processing unit 204 is communicatively coupled to a plurality of sensors 206-210 by way of a local bus 212. The local bus 212 can be a hard-wired bus and/or a wireless bus, thereby enabling the sensors 206-210 to communicate with the processing unit 204 in a wireless manner. A configuration component 214 can be employed to monitor the local bus 212 and detect when one or more of the sensors 206-210 is communicatively coupled and/or uncoupled to/from the local bus 212.

Upon detecting that one or more of the sensors 206-210 has been added and/or removed from the local bus 212, the configuration component 214 facilitates configuring the welding system 202 generally, and a process monitoring application specifically, according to number and type of sensors upon the local bus 212. For instance, a gas flow sensor can be positioned proximate to a welding unit to enable monitoring of gas flow. Upon connecting such gas flow sensor to the local bus 212, the configuration component 214 can detect that such sensor has been added to the local bus, and configure a process monitoring application to receive and analyze data obtained by way of the gas flow sensor. Furthermore, if it is unknown as to which welding unit the gas flow sensor is associated with, the configuration component 214 can request such information from an operator. Thereafter, the configuration component 214 can configure the gas flow sensor according to a process monitoring application and a desired welding unit.

The welding system 200 can also include a security component 216 that ensures that authorized users are adding/removing sensors from the local bus as well as ensuring that sensors are not added/removed without prior approval. For example, an operator can be required to provide a username and password prior to adding and/or removing sensors from the local bus 212. If an operator modifies sensors upon the local bus 212 without authorization, the welding system 202 can be disabled and/or an alarm can be generated. The security component 216 can likewise be utilized when an operator wishes to alter an existing process monitoring application. For instance, the operator may wish to alter which sensor(s) are utilized in connection with monitoring a process undertaken by a welding unit or collection of welding units. Prior to having access for such modification, the security component 216 can ask such operator for a username and/or password to ensure that such operator is authorized to alter the application monitoring application. Other security measures are also contemplated—for instance, biometric indicia can be employed to ensure that an operator is authorized to access and/or modify the welding system 202. For example, voice recognition systems, fingerprint analysis systems, retina scans, and the like can be utilized by the security component 216 to ensure that an operator is authorized to modify a process monitoring application.

Figure 3:
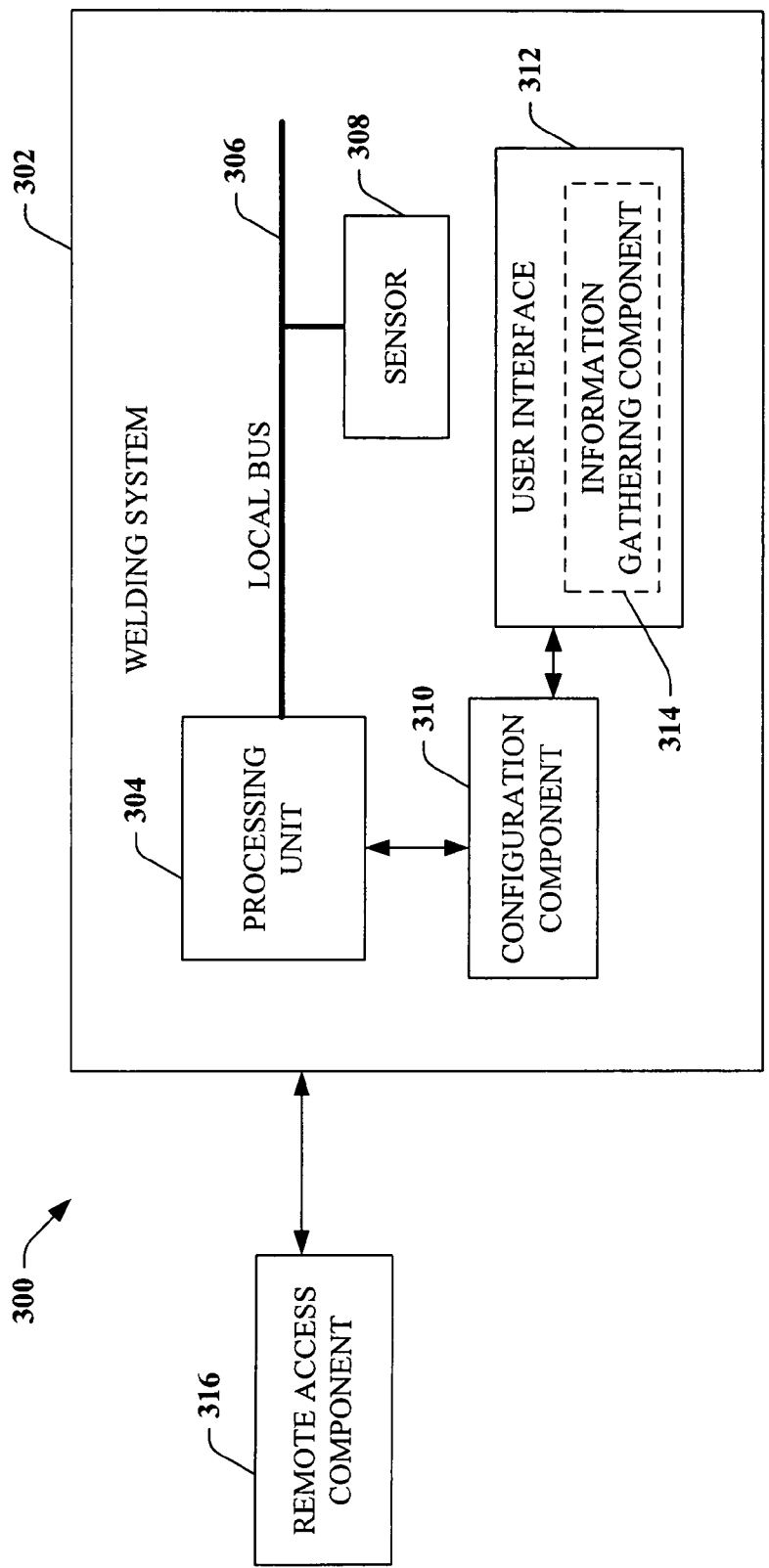
FIG. 3 is a block diagram of a system that facilitates obtaining information from an operator that can be employed to configure a welding system with respect to a sensor in accordance with an aspect of the subject invention.

Referring now to FIG. 3, a system 300 that facilitates configuring a welding system 302 to monitor a welding process is illustrated. The welding system 302 includes a processing unit 304 that is utilized to monitor a welding process and control such welding process. The processing unit 304 communicates with at least a portion of devices associated therewith by way of a local bus 306. For example, the processing unit 304 can receive data obtained via a sensor 308 and monitor a process based upon such data. The welding system 302 further includes a configuration component 310 that can monitor the local bus 306 to determine if devices in general, and sensors in particular, have been added or removed from such local bus 306. In one example, the sensor 308 can be added to the local bus 306. The configuration component 310 can detect such addition, and thereafter automatically configure the welding system 302 (and a process monitoring application) with respect to the sensor 308.

In a disparate example, the configuration component 310 may not be able to determine an identity and/or type of the sensor 308. Thus, the configuration component 310 may not be able to automatically configure the welding system 302. Accordingly, a user interface 312 can be provided to obtain information relating to the sensor 308, thereby enabling the configuration component 310 to configure the sensor 308 in accordance with the welding system 302 (and a process monitoring application). For example, if the configuration component 310 cannot obtain sufficient information to configure the welding system 302 in accordance with the sensor 308, the user interface 312 can be launched, thereby enabling an operator to provide the configuration component 310 with adequate information with respect to the sensor 308. For example, the user interface 312 can be a graphical user interface displayed on any suitable display, wherein an operator can exchange information with the configuration component 310 by way of the user interface 312 through use of keystrokes, pointing mechanisms, voice recognition techniques, pressure-sensitive screens, and the like. The user interface 312 is associated with an information gathering component 314 that can analyze a current setup of the welding system 302 and determine what information needs to be obtained in order to configure such welding system 302 to utilize data from the sensor 308. Thus, for instance, the information gathering component 314 can query an operator with respect to type of sensor, welding unit associated with the sensor, projected application of a welding unit and/or sensor, or any other suitable data relating to the sensor 308 that can be utilized in connection with configuring the welding system 302. Thus, upon adding/removing the sensor 308 to/from the local bus 306, the configuration component 310 can automatically configure the welding system 302 with respect to the sensor 308 if sufficient data exists for such automatic configuration. If there is a lack of sufficient data for automatic configuration, the user interface 312 can be launched as well as the information gathering component 314, thereby enabling obtainment of requisite data for configuring the welding system 302.

In accordance with another aspect of the subject invention, a remote access component 316 can enable a remote operator to review and modify configurations of sensors upon the local bus 306. For instance, an operator may desire to monitor a welding process from a remote location, and also make alterations to enable optimal process monitoring. The remote access component 316 enables such remote monitoring, and can enable data communication over any suitable network. For instance, the remote access component 316 can enable a computer to access the configuration component 310 over the Internet or an intranet. Thus, for instance, an operator can log onto a computing device, and by way of the remote access component 316 can review sensors resident upon the local bus 306 as well as information relating to such sensors. For instance, an operator can remotely review welding units associated with sensors, sensor types, process monitoring applications that employ sensors, and any other suitable data related to the sensors. Furthermore, the operator can modify application(s) of sensors and their use in connection with monitoring a process. For instance, the operator can determine that a gas flow sensor is associated with a particular welding unit, but that the sensor is not being employed to monitor a welding process undertaken by the welding unit. The operator can relay instructions by way of the remote access component 316 to configure the welding system 302 to utilize the gas flow sensor in connection with the aforementioned welding process.

Figure 4:
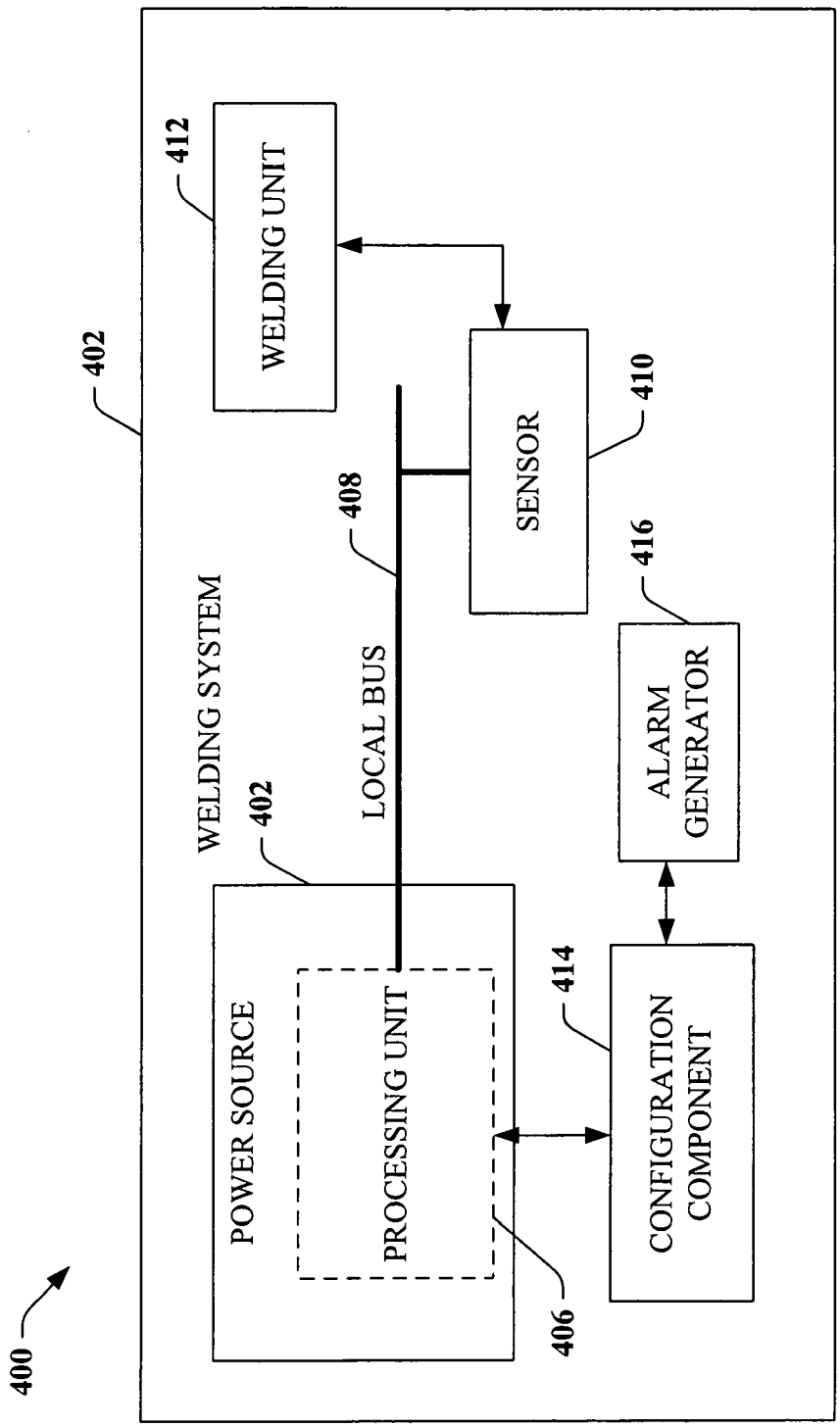
FIG. 4 is a block diagram of a system that facilitates generating an alarm if an unauthenticated operator attempts to modify a configuration of a welding system in accordance with an aspect of the subject invention.

Now turning to FIG. 4, a system 400 that facilitates configuration of a welding system 402 is illustrated. The welding system 402 includes a power source 404 that is utilized to provide power to devices within the welding system 402. A processing unit 406 lies within the power source 404, and communicates with devices within the welding system 402 by way of a local bus 408. For instance, the processing unit 406 can receive data from a sensor 410 that is coupled to the local bus 408. Furthermore, the sensor 410 can be associated with a welding unit 412 and obtain data relating to such welding unit 412. For instance, the sensor 410 can be a linear wire speed sensor that monitors velocity of wire delivered with respect to a weld. The power source 404 and the processing unit 406 can further be associated with a configuration component 414 that facilitates configuring the welding system 402 with respect to the sensor 410. Specifically, the configuration component 414 can monitor the local bus 408 and detect whether a sensor has been added/removed from such local bus 408. In an event that the sensor 410 is newly added, the configuration component 414 can configure the processing unit 406 to accept and analyze data from the sensor 410. Similarly, if the sensor 410 is detached from the local bus 408, the configuration component 414 can configure the processing unit 406 to cease expectancies of receiving data from the sensor 410. While illustrated as being external to the power source 404 and the processing unit 406 for purposes of illustration, the configuration component 414 can also be included within one or both of the power source 404 and the processing unit 406. As the sensor 410 can be added and/or removed from the local bus 408 at a will of an operator, such sensor 410 can be equipped with a physical interface that enables efficient integration of the sensor 410 with the local bus 408. For instance, a pin or series of pins can be associated with the sensor 410, which can then be physically coupled to the local bus 408.

The welding system 402 can further include an alarm generator 416 that is associated with the configuration component 414. The alarm generator 416 can monitor operations of the sensor 410 to ensure that such sensor 410 is providing adequate data to the processing unit 406. For instance, the alarm generator 416 can ensure that the sensor 410 has not failed and/or is not flawed. If the alarm generator 416 determines that a sensor is not operating properly, the alarm generator 416 can generate an alarm to an operator regarding the sensor 416. For example, an alarm can be displayed graphically on a screen, can be an audible alarm, or a combination thereof. Furthermore, the alarm generator 416 can be employed to ensure that unauthorized operators have not added/removed sensor(s) from the local bus 408. Thus, if an unauthorized person removes the sensor 410 from the local bus 408, an operator can be quickly informed and the sensor 410 can be replaced. In accordance with another aspect of the subject invention, the alarm generator 416 can be associated with a process monitoring application and can generate an alarm if a welding process undertaken by the welding unit 412 is found to be faulty.

Figure 5:
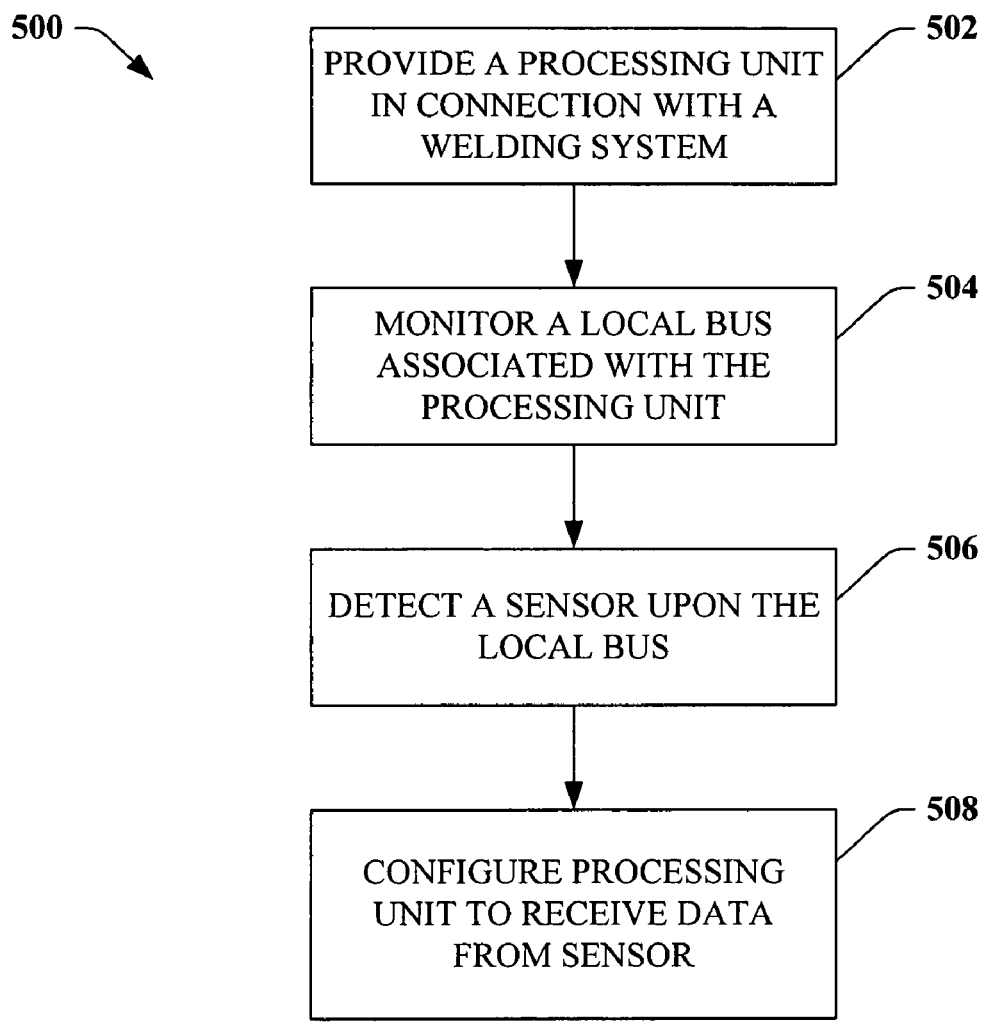
FIG. 5 is a flow diagram illustrating a methodology for dynamically configuring a welding system with respect to a sensor in accordance with an aspect of the subject invention.
Figure 6:
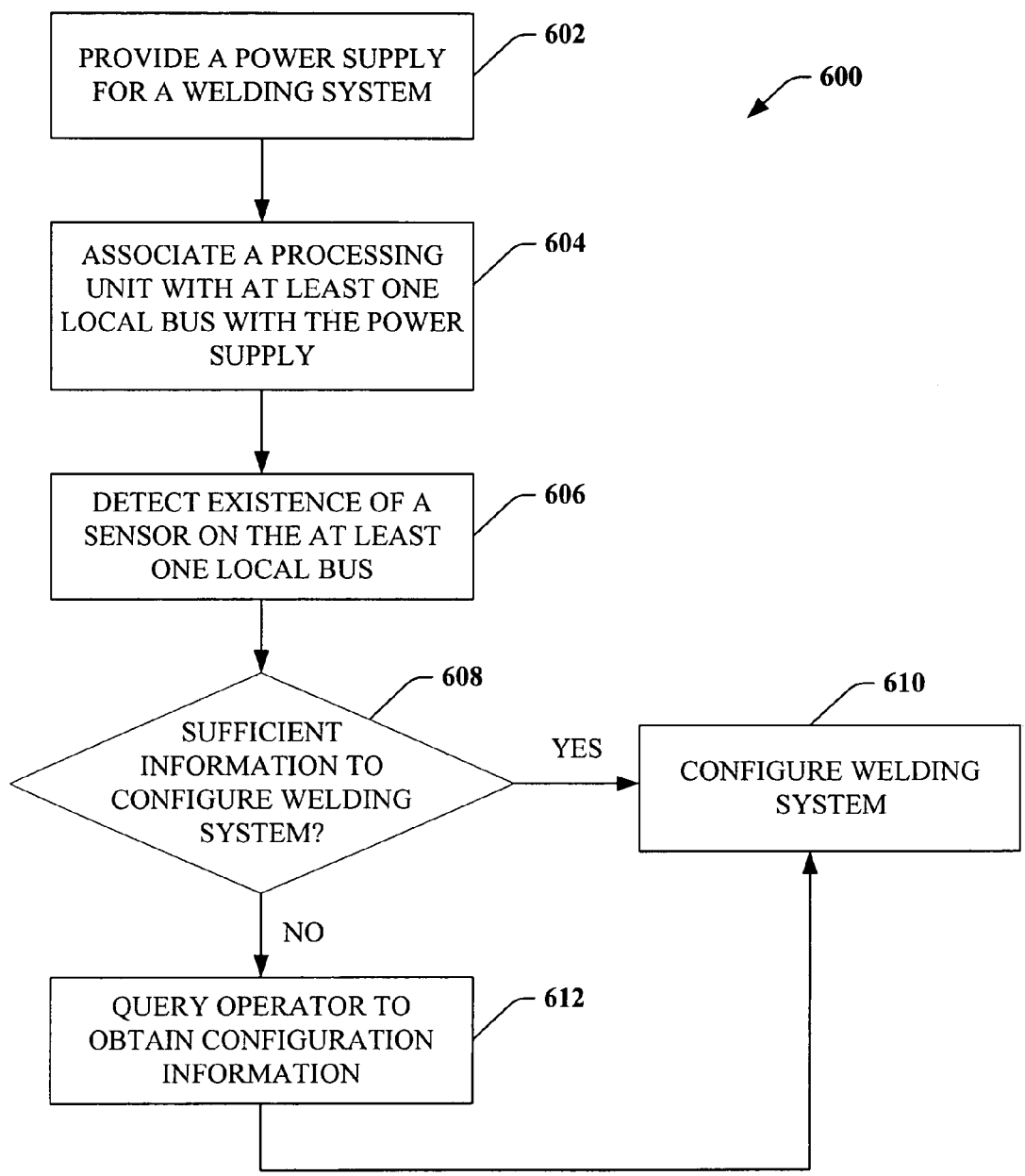
FIG. 6 is a flow diagram illustrating a methodology for obtaining configuration information from an operator in accordance with an aspect of the subject invention.
Figure 7:
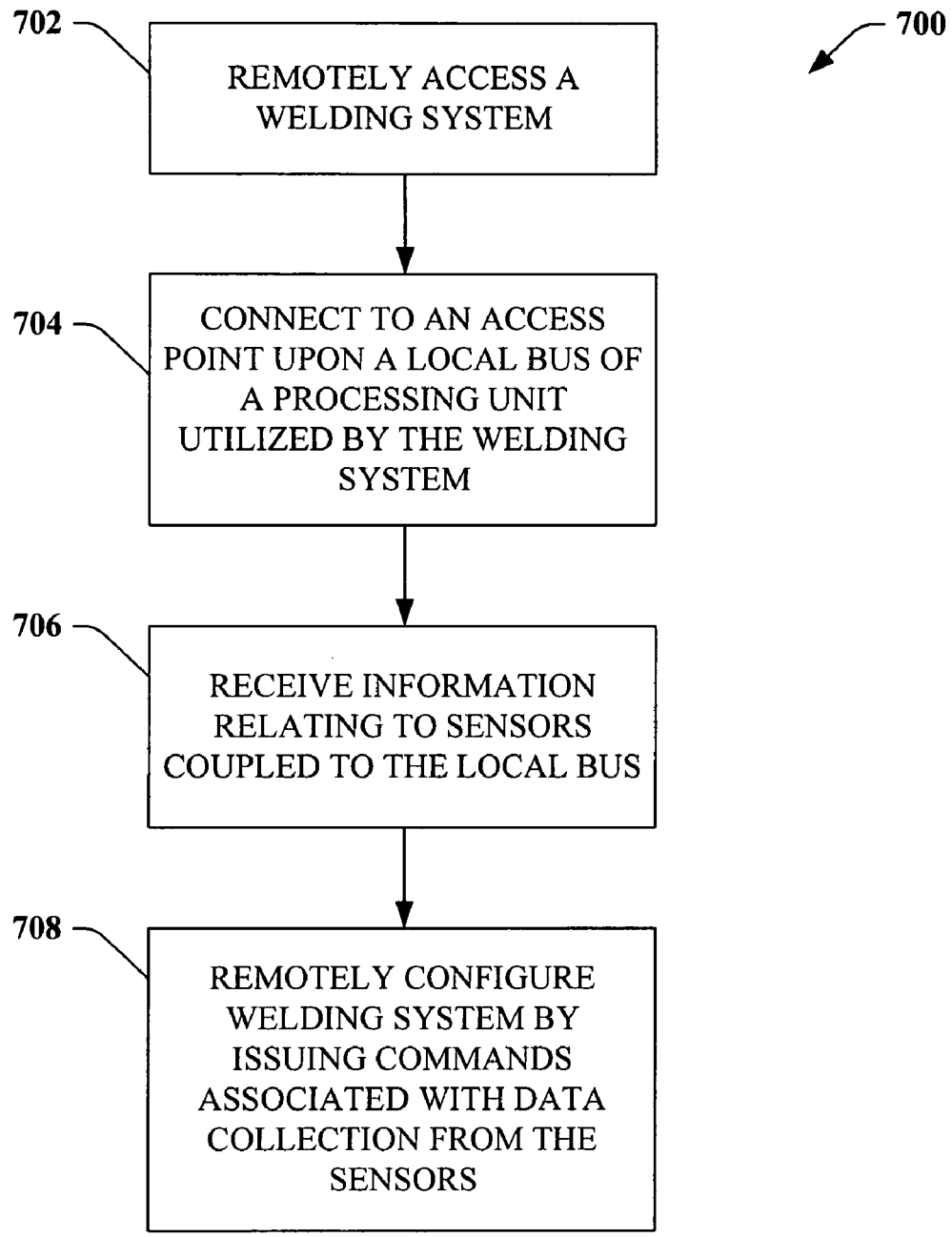
FIG. 7 is a flow diagram illustrating a methodology for remotely configuring a welding system with respect to one or more sensors in accordance with an aspect of the subject invention.

Referring to FIGS. 5-7, methodologies in accordance with various aspects of the subject invention are illustrated. While, for purposes of simplicity of explanation, the methodologies are shown and described as a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Now turning solely to FIG. 5, a methodology for configuring a processing unit within a welding system to receive and analyze data from a sensor added to a local bus associated with the processing unit is illustrated. At 502, a processing unit is provided in connection with a welding system. The processing unit can be a microprocessor, a microcontroller, or any other suitable processing component. The welding system can include various sensors, welding units, motors associated with the welding units, process monitoring applications, and other hardware/software that can be employed in connection with a welding application.

At 504, a local bus associated with the processing unit is monitored. In accordance with another aspect of the subject invention, a plurality of local buses can be associated with the processing unit, and all such local buses can be monitored. At 506, a sensor is detected upon the local bus. Such detection can occur dynamically (e.g., at a time proximate to a time that the sensor was added to the bus). Furthermore, the sensor can be any suitable sensor employable within a welding environment and/or a combination of sensors. For instance, sensors can be sold as a block unit, wherein disparate sensing mechanisms are couched within a single block.

At 508, the processing unit is configured to receive data from the sensor. In particular, the processing unit can be configured to receive and analyze data from the sensor with respect to monitoring and/or controlling a welding unit and/or a welding process undertaken by such welding unit. For instance, the sensor can be a voltage sensor that monitors an amount of voltage delivered from a power source to a particular welding unit. Upon coupling the sensor to a local bus, the processing unit can be configured to receive and analyze data from such sensor. Thereafter, a welding process can be monitored and/or controlled as a function of received data from the sensor.

Turning now to FIG. 6, a method for configuring a welding system upon addition of one or more sensors to a local bus is illustrated. At 602, a power supply is provided for a welding system. The power supply is employed to provide power to one or more welding units within the welding system, one or more sensors that are employed to monitor a process within the welding system, microprocessors and/or microcontrollers utilized within the welding system., and any other suitable devices within the welding system. At 604, a processing unit (e.g., a microprocessor, microcontroller, . . . ) is associated with at least one local bus that is related to the power supply. The processing unit utilizes the local bus to deliver and/or receive data to/from devices coupled to such local bus. At 606, existence of a sensor upon the local bus is detected. For instance, impedance resident upon the local bus can be monitored, and an alteration in impedance can indicate that a sensor or other device has been added to the local bus. In a disparate aspect, the sensors can be wirelessly coupled to the local bus, and existence of the wireless connection can be detected. Furthermore, configuration data can be collected upon detecting that a sensor has been positioned upon the local bus. For instance, the sensor can be associated with a particular type, and such type can be determined upon detecting the sensor upon the local bus.

At 608, a determination is made regarding whether sufficient information exists to configure the welding system with respect to the sensor. If sufficient information exists, then at 610 the welding system is configured to receive data from the sensor, analyze data from the sensor, and utilize such data in connection with controlling and/or monitoring a welding application. If insufficient data exists, then an operator is queries to obtain information that enables configuration at 612. For instance, an operator can be queries for sensor type, welding system application, desirable process monitoring indicia, and any other suitable data that enables the welding system to be configured to receive and analyze sensor-related data. Upon obtaining configuration information from the operator, the welding system can be configured at 610.

Now referring to FIG. 7, a methodology for remotely accessing a welding system and altering a configuration of the welding system with respect to one or more sensors within the welding system is illustrated. At 702, a welding system is remotely accessed. For instance, the welding system can be accessed over the Internet or intranet, over a wireless and/or wireline connection, etc. At 704, an access point is connected to a local bus or a processing unit, wherein such bus is utilized by the welding system in connection with delivering and/or receiving data relating to a welding process. Such access point enables the remote connection at 702. At 706, information relating to sensors coupled to the local bus is received over the remove connection. For instance, type of sensors coupled to the bus, applications that the sensors have been designed to monitor, and any other suitable information can be accessed and reviewed remotely, so long as the sensors are connected to the local bus. At 708, the welding system is configured remotely, wherein an operator remotely issues commands associated with data collection of the sensors. For instance, a remote operator can inform a process monitoring application to consider data from a subset of sensors on the local bus but not to consider data from other sensors coupled to the bus.

Figure 8:
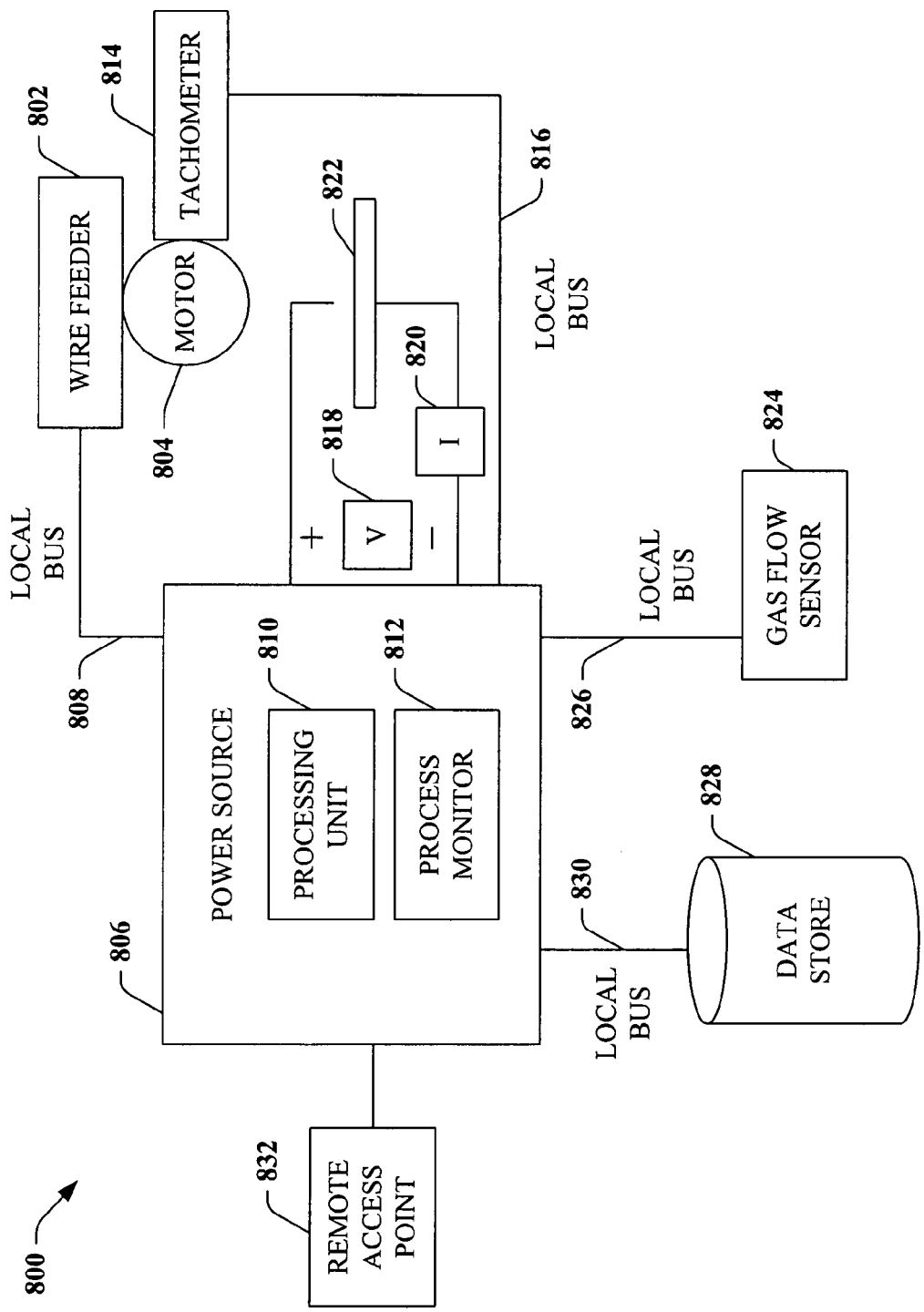
FIG. 8 is an exemplary embodiment illustrating one or more aspects of the subject invention.

Turning now to FIG. 8, an exemplary welding system 800 utilizing one or more aspects of the subject invention is illustrated. The welding system 800 includes a wire feeder 802 and a motor 804, which are employed to provide ignitable line to a weld. Such wire feeder 802 and motor 804 are coupled to a power source 806 by way of a local bus 808. The power source 806 includes a processing unit 810 that can communicate with devices coupled to the power source 806 and control operations of such devices. The power source 806 further includes a process monitor 812 that monitors process(es) undertaken by the welding system 800. A tachometer is proximate to the motor 804, and is utilized to measure rotations of such motor 804. For instance, this can be beneficial in connection with maintaining the motor 804. The tachometer 804 is coupled to the power source 806 by way of a local bus 816. Upon determining that the tachometer has been coupled to the local bus 816, the processing unit 810 can configure the process monitor 812 to receive data associated therewith and monitor a weld process associated with the motor 804.

A voltage sensor 818 is further coupled to the power source 806 by way of a local bus (not shown), and a current sensor 820 is likewise coupled to the power source 806. The voltage sensor 818 and the current sensor 820 can be utilized to ensure that the power source 806 is providing an appropriate amount of power to a welding unit. Thus, a piece 822 or pieces being welded will be subject to an appropriate voltage. A gas flow sensor 824 is further connected to the power source 806 (and the processing unit 810) by way of a local bus 826. Upon detecting that the gas flow sensor 824 is coupled to the local bus 826, the processing unit 810 can configure the process monitor 812 in a manner to receive and analyze data from such gas flow sensor 824. A data store 828 is coupled to the system by way of a local bus 830, thereby enabling the processing unit 810 to access such data store 828. For instance, configuration information can be located within the data store 828, and can be read from tables or the like. In a specific example, the gas flow sensor 824 can be coupled to the local bus 826, and the processing unit 810 can detect such connection. To configure the gas flow sensor 824, the processing unit 810 can access the data store 828 by way of the local bus 830 and obtain configuration information therefrom. The power source 806 is accessible from remote locations via a remote access point 832. Thus, a remote operator can access the power source 806 and the process monitor 812 and configure such process monitor 812 according to desires of the operator.

Figure 9:
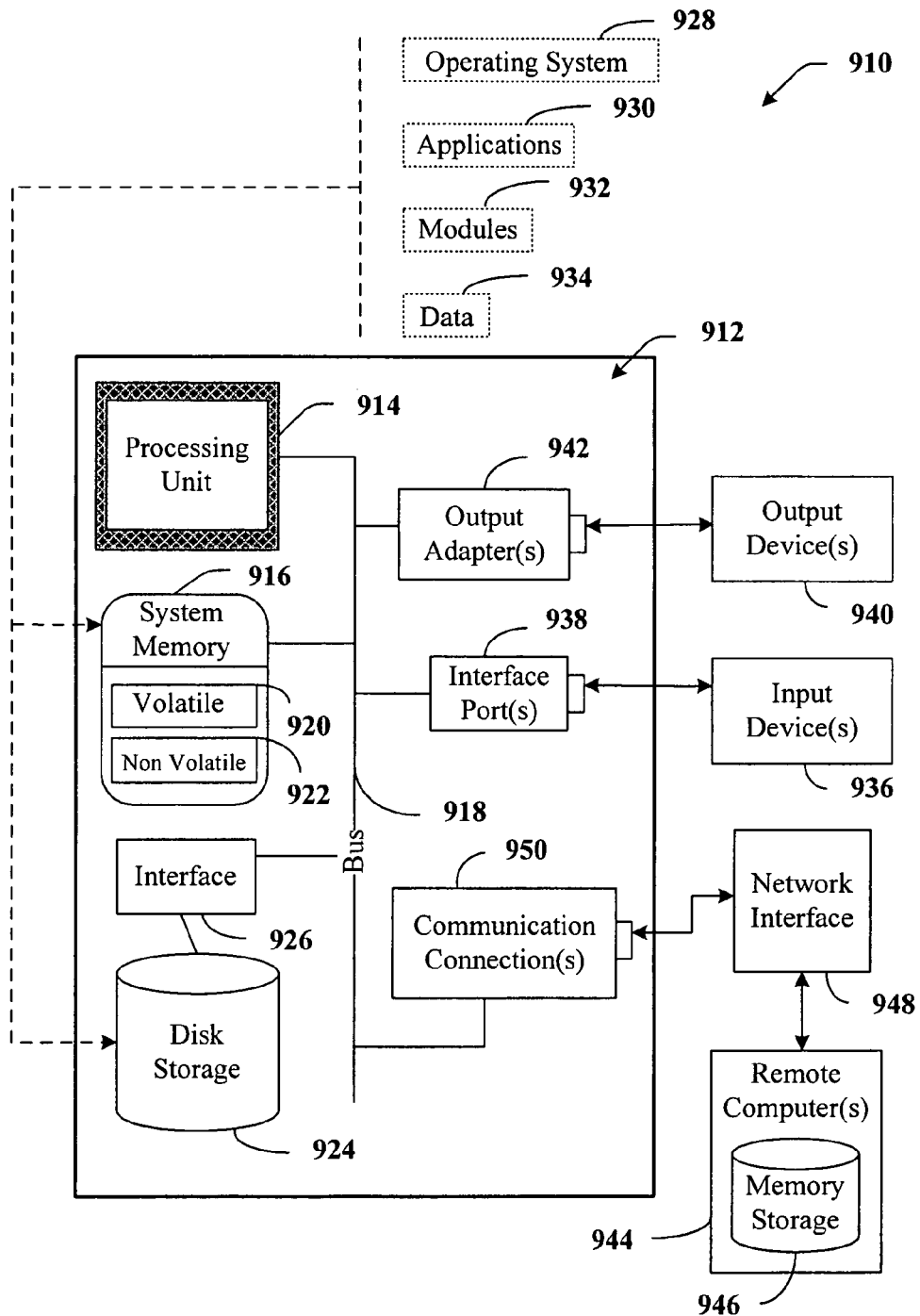
FIG. 9 is an exemplary computing environment that can be utilized in connection with the subject invention.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
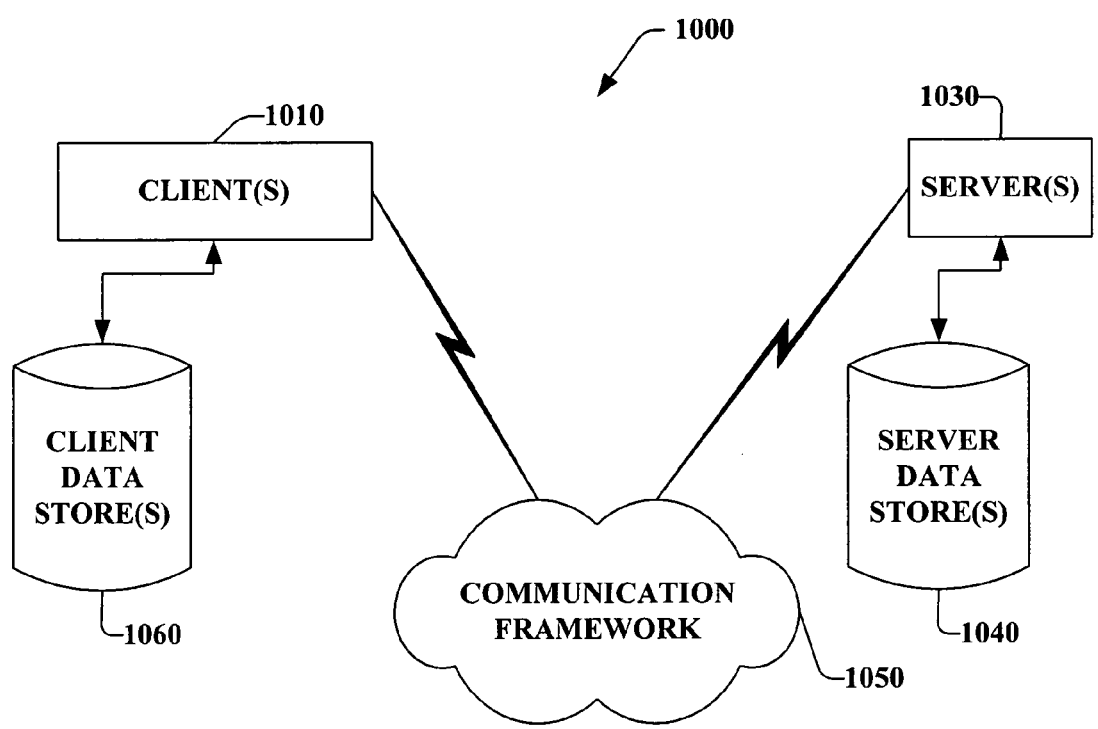
FIG. 10 is an exemplary operating environment that can be employed in connection with the subject invention.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the subject invention, for example. One possible communication between a client 1010 and a server 1030 can be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates dynamic configuration of a welding system with respect to a sensor, comprising:
   a processing unit associated with the welding system that monitors a local bus associated with the processing unit to automatically detect alteration of the sensor on the local bus; and
   a configuration component that facilitates configuring the welding system with respect to the sensor upon determining that the sensor is coupled to the local bus, wherein a welding process monitoring application is automatically configured to receive and utilize data from the sensor when the welding system is configured depending on the sensor type, facilitating control of at least one of a welding process or welding unit by adjusting at least one weld forming parameter to improve the weld.

2. The system of claim 1, the sensor is one or more of a linear wire speed sensor, a tachometer, a gas flow sensor, a temperature sensor, a humidity sensor, a proximity sensor, a visual joint sensor, a gap sensor, a voltage sensor, or a current sensor.

3. The system of claim 1, the local bus is associated with one or more interfaces, the welding system configured upon mechanically coupling such sensor to the local bus.

4. The system of claim 3, the welding system configured upon mechanically uncoupling the sensor from the local bus.

5. The system of claim 1, the sensor is wirelessly connected to the local bus.

6. The system of claim 1, further comprising a security component that authenticates the sensor prior to configuring the welding system.

7. The system of claim 6, the security component authenticates a user prior to configuring the welding system.

8. The system of claim 1, further comprising a remote access component that facilitates remotely accessing the welding system, the configuration of the welding system alterable by way of the remote access component.

9. The system of claim 1, further comprising an information gathering component that requests information from a user relating to the sensor upon the sensor becoming coupled to the local bus, when the configuration component is unable to determine the identity or type of the sensor.

10. The system of claim 9, the requested information employed in connection with configuring the welding system.

11. The system of claim 1, the welding system comprises a plurality of welding units.

12. The system of claim 1, the welding system comprises a single welding unit.

13. The system of claim 1, the configuration component automatically configures the welding system with respect to the sensor upon the sensor becoming coupled to the local bus, the configuration relating to adjusting at least one weld forming parameter to improve a weld.

14. The system of claim 1, further comprising an interface component that implements commands relating to collection of data from the sensor.

15. The system of claim 14, the commands are received from a remote location.

16. The system of claim 14, the commands inform the interface component to locate the sensor upon the local bus and begin collecting data from the sensor.

17. The system of claim 14, the commands inform the interface component to cease collecting data from the sensor.

18. The system of claim 1, the configuration component initiates an alarm if there exists insufficient data to configure the welding system with respect to the sensor.

19. The system of claim 1, further comprising a power source, the welding system configured upon providing the welding system power by way of the power source.

20. The system of claim 19, the sensor associates itself with a welding unit within the welding system upon the power source providing the welding system with power.

21. The system of claim 19, further comprising an alarm generator that generates an alarm if the sensor is not associated with a welding unit within the welding system.

22. The system of claim 1, further comprising a process monitor that monitors a process associated with the sensor, the monitoring based at least in part upon an analysis of data received from the sensor.

23. The system of claim 1, a power source comprising the processing unit.

24. A method for configuring a process monitoring application within a welding system, comprising:
- coupling a sensor to a local bus of a processing unit associated with the process monitoring application;
- employing the processing unit to monitor the local bus;
- automatically detecting existence of the sensor upon the local bus;
- automatically configuring the process monitoring application to receive and analyze data obtained from the sensor and configuring the welding system depending on a type of the sensor; and
- controlling at least one of a welding process or welding unit with the process monitoring application based on the data obtained from the sensor by adjusting at least one weld forming parameter to improve the weld.

25. The method of claim 24, further comprising:
- uncoupling the sensor from the local bus; and
- automatically configuring the process monitoring application to cease expectancies of receipt of data from the sensor.

26. The method of claim 24, wherein the detecting includes detecting the existence of the sensor upon the local bus upon initializing a power source associated with the processing unit.

27. The method of claim 24, wherein the configuring of the process monitoring application comprises querying a data store.

28. The method of claim 24, further comprising querying a user to obtain user data utilized for the configuring of the process monitoring application.

29. A system that facilitates configuration of a process monitoring application within a welding system, comprising:
- means for coupling a sensor to a local bus of a processing unit within the welding system;
- means for monitoring the local bus to automatically detect alteration of sensors on the local bus, wherein the processing unit provides the means for monitoring; and
- means for configuring the process monitoring application upon detecting that the sensor is coupled with the local bus, wherein the welding system is configured depending on a type of the sensor, the process monitoring application and welding system as configured control at least one of a welding process or welding unit by adjusting at least one weld forming parameter to improve the weld.

30. The system of claim 29, further comprising:
- means for remotely reviewing the local bus and devices coupled to the local bus; and
- means for altering configuration of the process monitoring application.

31. The system of claim 29, the means for configuring the process monitoring application includes means for detecting that a plurality of sensors is coupled with the local bus.

* * * * *